United States Patent
Sangameswaran et al.

(10) Patent No.: US 10,678,530 B2
(45) Date of Patent: Jun. 9, 2020

(54) VEHICLE UPDATE SYSTEMS AND METHODS

(71) Applicant: Ford Global Technologies, LLC, Dearborn, MI (US)

(72) Inventors: Sangeetha Sangameswaran, Canton, MI (US); Jason Michael Miller, Woodhaven, MI (US); William C. Dierker, Canton, MI (US); Doug B. Thornburg, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 235 days.

(21) Appl. No.: 15/865,800

(22) Filed: Jan. 9, 2018

(65) Prior Publication Data
US 2019/0212997 A1  Jul. 11, 2019

(51) Int. Cl.
| | |
|---|---|
| G06F 8/65 | (2018.01) |
| G07C 5/08 | (2006.01) |
| B60L 58/13 | (2019.01) |
| H04L 29/08 | (2006.01) |
| G07C 5/00 | (2006.01) |

(52) U.S. Cl.
CPC ............... G06F 8/65 (2013.01); B60L 58/13 (2019.02); G07C 5/08 (2013.01); G07C 5/0808 (2013.01); H04L 67/12 (2013.01); B60L 2270/40 (2013.01); G07C 5/008 (2013.01)

(58) Field of Classification Search
CPC ........... G06F 8/65; G07C 5/0808; G07C 5/08; G07C 5/008; B60L 58/13; B60L 2270/40; H04L 67/12
See application file for complete search history.

(56) References Cited

U.S. PATENT DOCUMENTS

| | | | |
|---|---|---|---|
| 8,428,789 B2 | 4/2013 | Dulzo et al. | |
| 9,152,408 B2 | 10/2015 | Murata et al. | |
| 9,529,584 B2 | 12/2016 | Eling | |
| 9,543,783 B2 | 1/2017 | Soong et al. | |
| 9,575,743 B1 | 2/2017 | Chun | |
| 9,606,790 B2 | 3/2017 | Throop et al. | |
| 2013/0197712 A1* | 8/2013 | Matsuura | B60R 25/24 701/1 |
| 2014/0109075 A1* | 4/2014 | Hoffman | G06F 8/65 717/169 |
| 2014/0257608 A1* | 9/2014 | Dufford | B60W 20/40 701/22 |
| 2014/0380296 A1* | 12/2014 | Pal | G06F 8/65 717/171 |

(Continued)

Primary Examiner — Rodney A Butler
(74) Attorney, Agent, or Firm — Frank Lollo; Eversheds Sutherland (US) LLP

(57) ABSTRACT

Systems, devices, and methods are disclosed for determining whether to provide an over-the-air (OTA) update to a vehicle. An example method includes determining an update characteristic of a pending software update for a vehicle. The method also includes determining a vehicle battery state of charge (SOC) threshold based on the update characteristic. The method further includes modifying the threshold based on a location of the vehicle. The method still further includes determining a SOC of a battery of the vehicle. And the method yet further includes responsively providing the pending software update to the vehicle based on the SOC and the threshold.

17 Claims, 4 Drawing Sheets

(56) References Cited

U.S. PATENT DOCUMENTS

| | | | |
|---|---|---|---|
| 2015/0169311 A1* | 6/2015 | Dickerson | G06F 8/65 |
| | | | 717/170 |
| 2017/0322791 A1* | 11/2017 | Tiles | G06F 8/65 |
| 2018/0272964 A1* | 9/2018 | Netter | B60L 50/15 |
| 2019/0087169 A1* | 3/2019 | Arai | H04W 4/44 |

* cited by examiner

VEHICLE UPDATE SYSTEMS AND METHODS

TECHNICAL FIELD

The present disclosure generally relates to vehicle system updates and, more specifically, systems and methods for performing over-the-air updates to a vehicle.

BACKGROUND

A typical vehicle may have one or more computing systems that may require updates over time, to provide added security and functionality. These updates may be performed via a physical connection to the vehicle at a dealership or maintenance facility, or may be performed "over-the-air" via a communication link between the vehicle and a remote server or computing system.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown for providing over-the-air updates to a vehicle based on the vehicle location, such that the update does not cause the battery to drop below a threshold level. An example disclosed vehicle over-the-air update system includes a vehicle configured to determine a vehicle battery state of charge (SOC). The system also includes a server. The server is configured to determine an update characteristic of a pending software update for the vehicle. The server is also configured to determine a vehicle battery SOC threshold based on the update characteristic. The server is further configured to modify the threshold based on a determined location of the vehicle. And the server is still further configured to responsively provide the pending software update to the vehicle based on the vehicle battery SOC and the threshold.

An example disclosed method includes determining an update characteristic of a pending software update for a vehicle. The method also includes determining a vehicle battery state of charge (SOC) threshold based on the update characteristic. The method further includes modifying the threshold based on a determined location of the vehicle. The method still further includes determining a SOC of a battery of the vehicle. And the method yet further includes responsively providing the pending software update to the vehicle based on the SOC and the threshold.

An example disclosed tangible, computer readable medium includes instructions that, when executed by a processor, cause performance of a set of acts including determining an update characteristic of a pending software update for a vehicle. The set of acts also includes determining a vehicle battery state of charge (SOC) threshold based on the update characteristic. The set of acts further includes modifying the threshold based on a location of the vehicle. The set of acts further still includes determining a vehicle battery SOC. And the set of acts yet further includes responsively providing the pending software update based on the vehicle battery SOC and the threshold.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
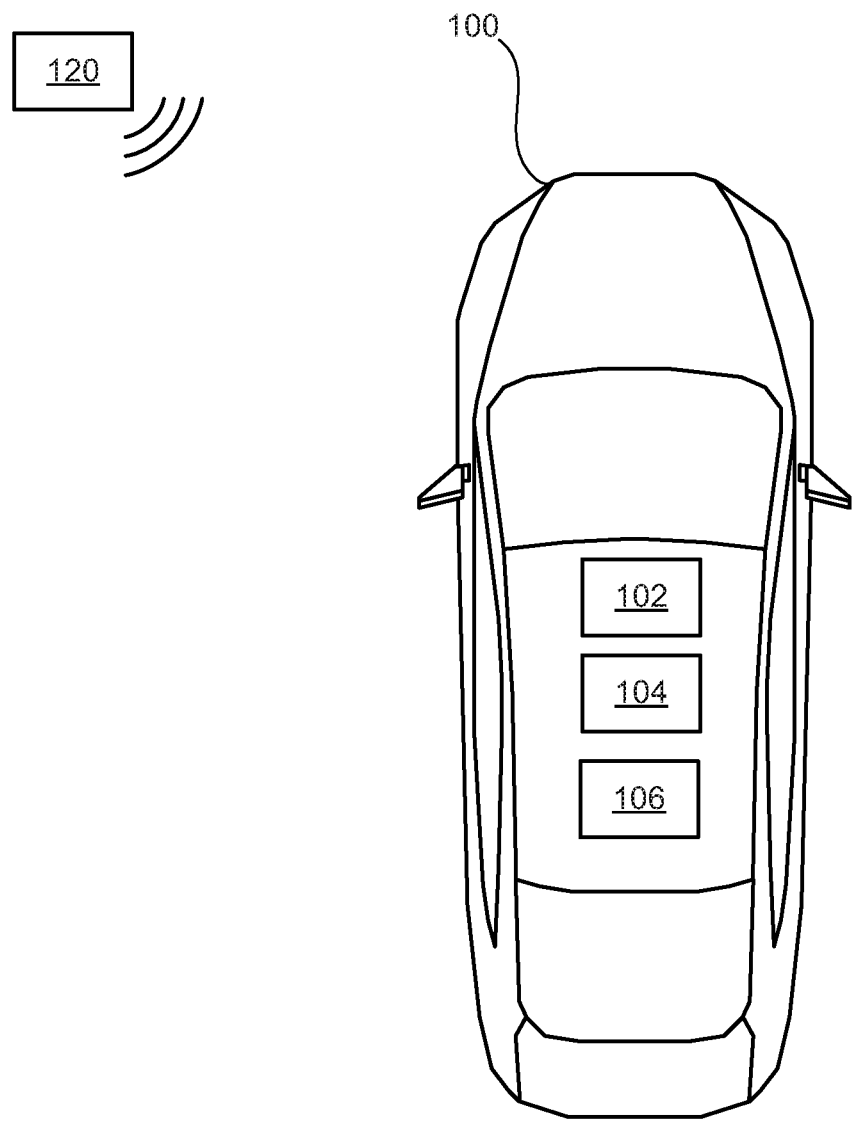
FIG. 1 illustrates an example vehicle and server according to embodiments of the present disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

As noted above, some vehicle systems may require an update from time to time, to provide added security and functionality. These updates may require the vehicle to be not in use, so that the vehicle systems are not in use while the update is in progress. In some examples, an update may be performed by physically connecting to the vehicle, such as with a diagnostic tool. The vehicle may be put into a programming mode, wherein the current software is erased and replaced with the updated software. The vehicle may also be connected to an external power source, so as to not run down the battery and ensure that sufficient power is supplied to the vehicle systems (such as electronic control units (ECUS)) during the update process.

Alternatively, updates may be provided over-the-air (OTA). If an OTA update is performed while the vehicle is turned off, the engine and alternator may not be able to provide power to the vehicle systems and battery. As such, an OTA update performed while the vehicle is off may run down the battery, which can cause issues. For instance, if the battery is run down too much during an update, the vehicle may not be able to restart after the update is completed. Further, the battery may not be able to provide sufficient power to one or more vehicle ECUs which may be needed during the update process to provide data and diagnostic information.

The vehicle battery may have a natural tendency to decrease its state of charge (SOC) over time, even when the vehicle is turned off. This may be due to one or more "key-off" loads, or vehicle systems that draw power while the vehicle is off such as keyless entry, security systems, etc. The vehicle may be designed to charge the battery to a sufficient level prior to turning off such that the vehicle may start again even after a long period of time, by factoring in the known power draw from the key-off loads. However when an OTA update is performed, the battery SOC may be decreased by greater than the expected amount, meaning that the vehicle may not start again after a given period of time. For instance, the vehicle may be designed such that the key-off loads allow the vehicle to start even after a month of being off and not charging the battery. However an OTA update may drain power from the battery causing the battery to reach a state in which it cannot start the vehicle after two weeks, effectively cutting off a large amount of time that the vehicle can lay dormant before requiring the battery to be charged.

These issues can be particularly relevant where a vehicle is parked in a long term parking lot, such as at an airport long term parking lot or when a driver goes on vacation.

With these issues in mind, embodiments of the present disclosure may include determining whether to perform a full or partial OTA update based on one or more characteristics of the update, the vehicle SOC, and one or more thresholds set and/or modified based on the vehicle battery characteristics and the vehicle location. If the current battery SOC is not above the threshold, then the update may not be performed, or only a partial update may be performed. Likewise, if the current battery SOC is above the threshold, the update may be performed.

FIG. 1 illustrates an example system that includes a vehicle 100 and a server 120. Vehicle 100 may be a standard gasoline powered vehicle, a hybrid vehicle, an electric vehicle, a fuel cell vehicle, or any other mobility implement type of vehicle. Vehicle 100 may be non-autonomous, semi-autonomous, or autonomous. Vehicle 100 may include parts related to mobility, such as a powertrain with an engine, a transmission, a suspension, a driveshaft, and/or wheels, etc. In the illustrated example, vehicle 100 may include one or more electronic components which may be discussed with reference to FIG. 2.

Vehicle 100 may include a battery 102, a communication module 104, and one or more sensors 106. The battery 102 may be a rechargeable, low voltage battery, configured to provide power to one or more vehicle systems both while the vehicle is on and while the vehicle is off. One or more vehicle systems may be termed "key-off loads" and they may draw power from the battery 102 while the vehicle is off. These key-off loads may include security systems, keyless entry systems, one or more communication systems, and/or one or more other vehicle systems.

The communication module 104 may be configured to communicate with the server 120, using one or more wireless communication protocols. The communication module 104 may be configured to receive and transmit data, which may include receiving and transmitting battery information, vehicle location information, OTA updates, and more. Communication module 104 may be part of or may include one or more computing devices, such as those described with respect to FIG. 3.

Sensors 106 may include one or more battery sensors, configured to monitor the state of charge, voltage, temperature, and/or any other characteristic of the battery 102. In addition, sensors 106 may include various cameras, microphones, and other sensors configured to capture data corresponding to vehicle 100.

Server 120 may be configured to carry out one or more functions or actions described herein. Server 120 may include or be part of a computing system, such as the computing system described with respect to FIG. 3.

Some embodiments disclosed herein may include determining that there is an update pending for a given vehicle. The update may be a software update for one or more vehicle systems that patches security flaws, increases vehicle system functionality, or otherwise makes one or more changes to the software of one or more vehicle systems, such as electronic control units (ECUs) of the vehicle.

In some examples, it may be determined that there is an update pending based on an ID associated with the current version of the vehicle software. For instance, the vehicle may have a particular version of the software, and that version may be checked against a most recent version to determine that the installed software is out of date. The vehicle 100 and/or server 120 may check if there is an update available each time the vehicle is turned on, each time the vehicle is turned off, or based on another event. In some examples, a key-off event (e.g., the vehicle turning off) may trigger an action to determine whether there is a pending update for the vehicle. Further, the vehicle 100 may be configured to transmit data to the server 120 at regular intervals to check if there is an update available.

A pending update may include one or more update characteristics which may be determined by the server 120, and/or the vehicle 100. The update characteristic may include (a) a file size, (b) a predicted duration required to transmit the update to the vehicle, (c) a predicted time to install or implement the update on the vehicle, (d) a list of vehicle systems required to perform the update, either before, during, or after the update (in order to provide information about the vehicle systems to complete the update), (e) a list of ECUs required to perform the update, either before, during, or after, and many more.

In some examples, the pending update may include a plurality of distinct files, which may comprise a plurality of updates that may be performed independently. Each file may have one or more corresponding update characteristics, such as those described above. Further, in some cases a key-off event may trigger a determination of the update characteristic, or plurality of update characteristics corresponding to the update or updates.

Some embodiments may further include determining a vehicle battery state of charge (SOC) threshold based on the update characteristic. For instance, each update file may have a corresponding amount of charge depletion that is expected should the update be carried out. A large update (determined based on a relatively large file size) may have a larger corresponding amount of battery depletion associated with it than a small update. The amount of battery depletion may correspond to an expected reduction in the battery state of charge if the update is performed. And where there are a plurality of update files in the pending update, each update file may have a corresponding amount of expected battery depletion.

Determining the SOC threshold may include determining an amount that the battery must be at before the update is performed. For instance, an example update may include a single file that corresponds to an expected reduction in the battery SOC of three percent (3%). Where it is determined that the battery should be above 80% upon completion of the update, the SOC threshold may be determined to be 83%, so as to leave the battery at 80% upon completion of the update. Then, the update may not be performed unless the vehicle battery SOC is above 83%.

A smaller update may only require 1% of the battery SOC. As such, the threshold for a smaller update may be 81%. The numbers used are for illustration only, and it should be noted that other thresholds may be used as well.

As seen above, a single update may include a single battery threshold. However where the update includes a plurality of files, each file may have a corresponding threshold. Further, each combination, subset, or permutation of the plurality of files may have a corresponding threshold as well. The number of subsets and corresponding thresholds may be defined as $X=2^N-1$, where X is the number of subsets/thresholds, and N is the number of files. As such, where there are three separate update files, there may be seven separate thresholds (file 1, file 2, file 3, combined files 1 and 2, combined files 1 and 3, combined files 2 and 3, and combined files 1, 2, and 3).

In some examples, the threshold(s) may be determined based on one or more update characteristics of the update file or files (described above). The threshold(s) may also be determined based on one or more characteristics of the vehicle battery itself. For instance, one or more of the vehicle sensors 106 may be used to detect a health of the battery, such as the temperature, current, voltage, etc. This information may be used in part to determine the SOC threshold for a given update, such that an older or less healthy battery requires a higher threshold than a healthier battery. This may prevent the unhealthy battery from dropping too low during the update. As a result, in some examples the same update may have a first threshold for a first vehicle, and a second, different, threshold for a second vehicle, based on the specifics of the battery of each vehicle.

In some embodiments, the determined SOC threshold for a given update may be modified based on a location of the vehicle. As noted above, if the vehicle is parked in a long term parking location, or is predicted to be off for an extended period of time, the SOC threshold required to be met before an update is performed may be increased or decreased based on this information.

The location of the vehicle may be determined based on GPS data, a connection between the vehicle (via the communication module 104) and a cell tower, or using any other location determination method.

In some examples, the vehicle location may be determined upon detecting a key off event. In this case, the location of the vehicle may correspond to the location at which it was last turned off. This location may then be transmitted to the server 120.

In some examples, the vehicle location may be predicted, such as a predicted location at which the vehicle is likely to be parked or stopped for an extended period of time. Embodiments may include predicting that the vehicle is going to be parked in a long term parking lot based on GPS (i.e., the location of the vehicle matches a known long term parking lot), a route or guidance location entered by the driver, the driver's calendar or other information integrated with the vehicle, a known pattern of vehicle use, and more. This information may be used to predict the location at which the vehicle will be turned off next, and in some cases the prediction may be done while the vehicle is currently active or in motion.

The SOC threshold corresponding to the pending update may be modified based on the known or predicted location of the vehicle at the time the update is going to be performed. For instance, if it is known that the vehicle will be parked in a long term parking, lot, the SOC threshold may be increased.

Where there are a plurality of update files and a plurality of thresholds, modifying the SOC threshold may include modifying all or a subset of the thresholds. In practice, this may include increasing the threshold(s) if the vehicle is parked in a long term parking lot. The increased threshold may make it more likely that the vehicle battery is not depleted before the driver returns. This is done by ensuring that the update does not leave the vehicle with too low of a battery SOC, by preventing updates which would do so from being performed.

Some embodiments may further include determining a SOC of the battery of the vehicle. The battery SOC level may be determined at a key-off event, and/or may be determined based on one or more other triggers as well. The battery SOC level may be transmitted from the vehicle 100 to the server 120, along with other battery information determined by one or more vehicle sensors.

After the vehicle battery SOC is determined, the SOC may be compared to the SOC threshold. If the SOC is greater than the threshold, the update may be performed. If there are a plurality of different thresholds for a plurality of different files, the SOC may be greater than some thresholds but less than others. In this case, a subset of the update files may be performed based on the SOC being greater than the threshold corresponding to the subset.

Based on the determined SOC and threshold(s), embodiments may include, responsive to determining the battery SOC, providing the pending software update to the vehicle. The pending software update may include all or a subset of the pending software update files, as discussed herein. In some embodiments, the update is provided over the air, while the vehicle is turned off.

Some embodiments may include providing a notification to a remote computing device corresponding to the vehicle (e.g., a phone or computer of an owner or driver of the vehicle). The notification may indicate that a software update is about to be performed or is in progress, thereby alerting the driver that the vehicle cannot be used for a period of time. The driver may also be provided with an option to forego the update, or prevent the update from taking place. This may be done by receiving input at the remote computing device and communicating it to the server, which may then determine not to perform the update.

In some examples, the battery SOC may be determined while the vehicle is in motion or is turned on, prior to a key-off event. The vehicle battery SOC may be increased in anticipation of a pending update, so as to increase the likelihood that the battery SOC is greater than the threshold upon the vehicle being turned off.

Figure 2:
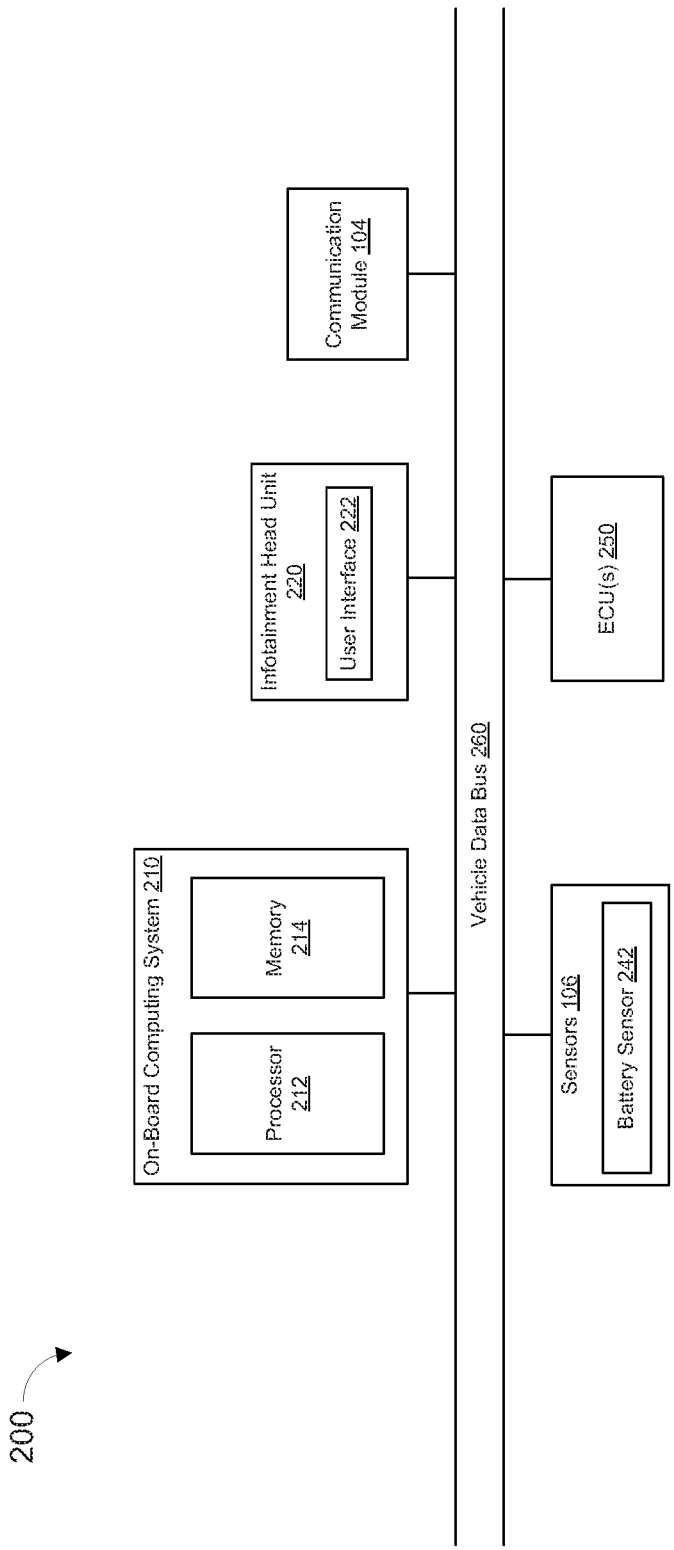
FIG. 2 illustrates a simplified block diagram of example electronic components of the vehicle of FIG. 1 according to embodiments of the present disclosure.

FIG. 2 illustrates an example block diagram 200 showing electronic components of vehicle 100, according to some embodiments. In the illustrated example, the electronic components 200 include the on-board computing system 210, infotainment head unit 220, communication module 104, sensors 106, electronic control unit(s) 250, and vehicle data bus 260.

The on-board computing system 210 may include a microcontroller unit, controller or processor 212 and memory 214. Processor 212 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 214 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 214 includes multiple kinds of memory, particularly volatile memory and non-volatile memory.

The memory 214 may be computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 214, the computer readable medium, and/or within the processor 212 during execution of the instructions.

The terms "non-transitory computer-readable medium" and "tangible computer-readable medium" include a single medium or multiple media, such as a centralized or distributed database, and/or associated caches and servers that store one or more sets of instructions. Further, the terms "non-transitory computer-readable medium" and "tangible computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The infotainment head unit 220 may provide an interface between vehicle 100 and a user. The infotainment head unit 220 may include one or more input and/or output devices in the form of a user interface 222 having one or more input devices and output devices. The input devices may include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, a heads-up display, a center console display (e.g., a liquid crystal display (LCD), an organic light emitting diode (OLED) display, a flat panel display, a solid state display, etc.), and/or speakers. In the illustrated example, the infotainment head unit 220 includes hardware (e.g., a processor or controller, memory, storage, etc.) and software (e.g., an operating system, etc.) for an infotainment system (such as SYNC® and MyFord Touch® by Ford®, Entune® by Toyota®, IntelliLink® by GMC®, etc.). In some examples the infotainment head unit 220 may share a processor with on-board computing system 210. Additionally, the infotainment head unit 220 may display the infotainment system on, for example, a center console display of vehicle 100.

Sensors 106, in addition to the description above with respect to FIG. 1, may be arranged in and around the vehicle 100 in any suitable fashion. In the illustrated example, sensors 106 may include a battery sensor 242. The battery sensor 242 may be configured to detect and measure one or more characteristics of the vehicle battery, such as the temperature, output voltage and current, charging voltage and current, and many other characteristics. As such, the battery sensor 242 may include two or more sensors.

The ECUs 250 may monitor and control subsystems of vehicle 100. ECUs 250 may communicate and exchange information via vehicle data bus 260. Additionally, ECUs 250 may communicate properties (such as, status of the ECUs 250, sensor readings, control state, error and diagnostic codes, etc.) to and/or receive requests from other ECUs 250. Some vehicles may have seventy or more ECUs 250 located in various locations around the vehicle communicatively coupled by vehicle data bus 360. ECUs 250 may be discrete sets of electronics that include their own circuit (s) (such as integrated circuits, microprocessors, memory, storage, etc.) and firmware, sensors, actuators, and/or mounting hardware.

Vehicle data bus 260 may include one or more data buses that communicatively couple the on-board computing system 210, infotainment head unit 220, communication module 104, sensors 106, ECUs 250, and other devices or systems connected to the vehicle data bus 260. In some examples, vehicle data bus 260 may be implemented in accordance with the controller area network (CAN) bus protocol as defined by International Standards Organization (ISO) 11898-1. Alternatively, in some examples, vehicle data bus 260 may be a Media Oriented Systems Transport (MOST) bus, or a CAN flexible data (CAN-FD) bus (ISO 11898-7).

Figure 3:
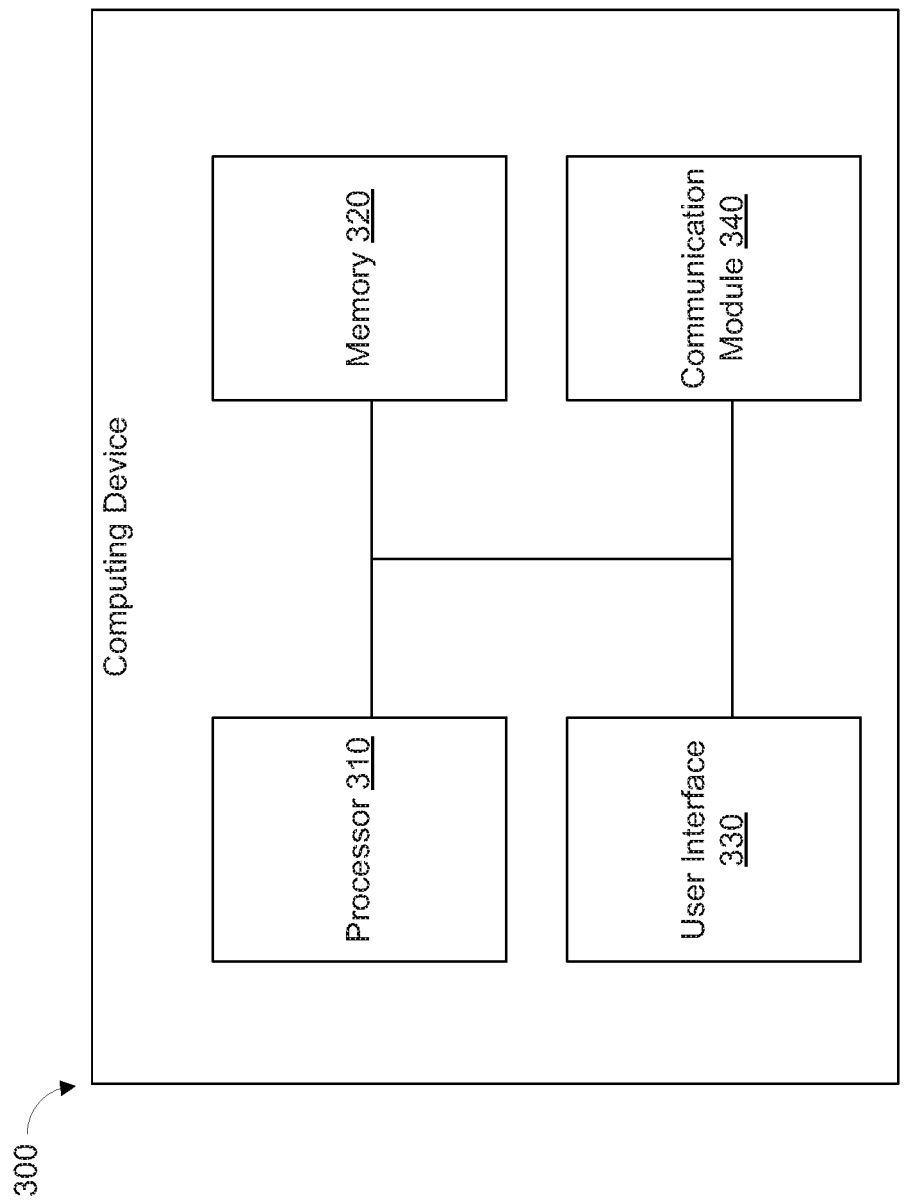
FIG. 3 illustrates a simplified block diagram of the server of FIG. 1, according to embodiments of the present disclosure.

FIG. 3 illustrates an example block diagram of a computing device 300 according to embodiments of the present disclosure. One or more features of computing device 300 may be included in vehicle 100, server 120, and other devices or systems described herein.

Computing device 300 may include a processor 310 and a memory 320, which may be similar or identical to the processor 212 and/or memory 214 described with respect to FIG. 2. Computing device 300 may also include a user interface 330 configured to provide the ability for a user to interact with and control computing device 300. User interface 330 may include one or more input and/or output devices to receive input from and display information to a user. The input devices may include, for example, a control knob, an instrument panel, a digital camera for image capture and/or visual command recognition, a touch screen, an audio input device (e.g., microphone), buttons, or a touchpad. The output devices may include one or more displays, (e.g., a liquid crystal display (LCD), an organic light emitting diode (OLED) display, a flat panel display, a solid state display, etc.), and/or speakers.

Computing device 300 may further include one or more communication modules 340. Communication module 340 may allow wired or wireless communication with one or more other computing devices or systems using one or more communication protocols. The communications module may include wired or wireless network interfaces to enable communication with external networks. The communications module may also include hardware (e.g., processors, memory, storage, etc.) and software to control the wired or wireless network interfaces. The communications module may include, among others, an NFC module, a Bluetooth module, a GPS receiver, a dedicated short range communication (DSRC) module, a WLAN module, and/or a cellular modem, all electrically coupled to one or more respective antennas.

Figure 4:
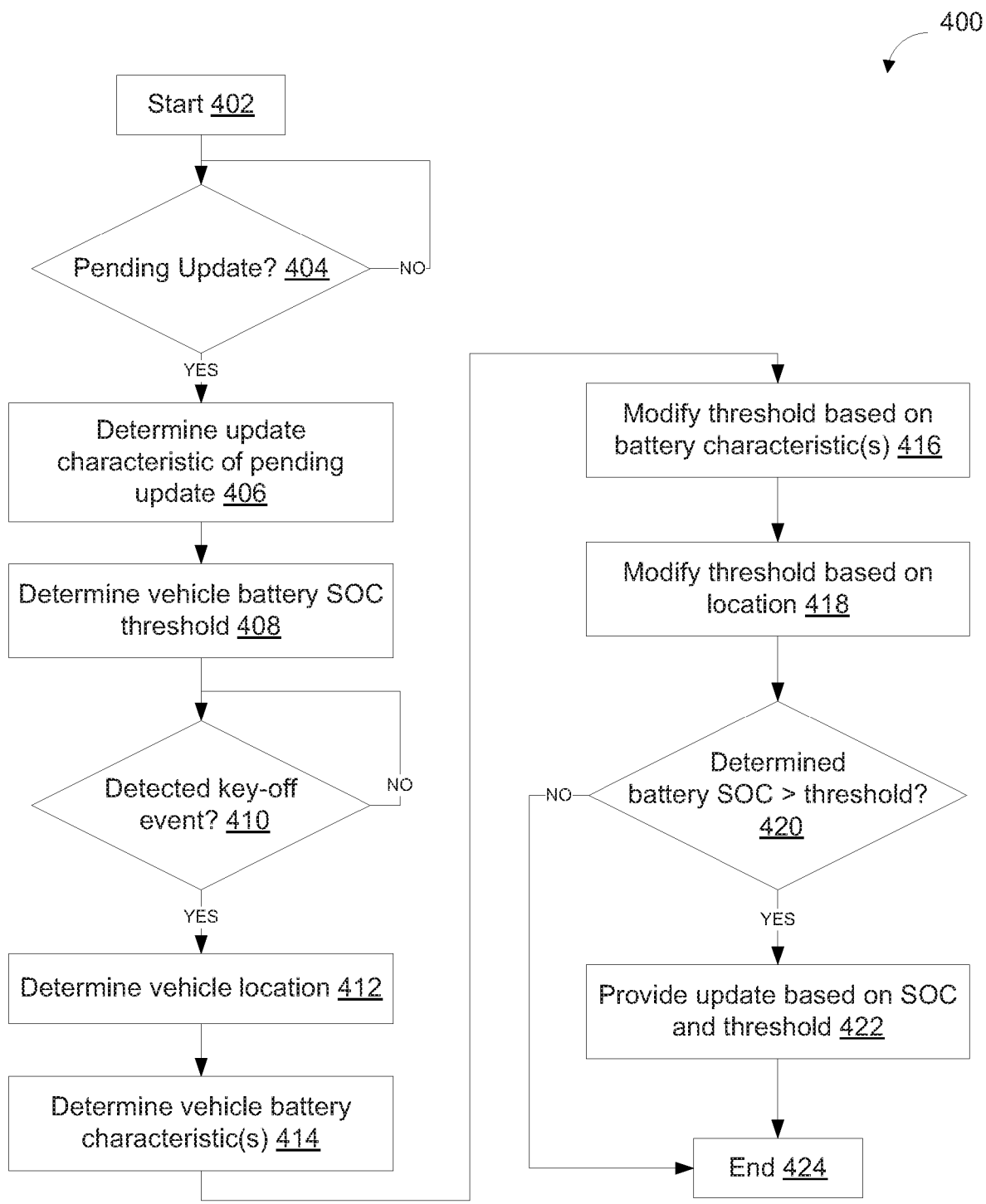
FIG. 4 illustrates a flowchart of an example method according to embodiments of the present disclosure.

FIG. 4 illustrates an example method 400 according to embodiments of the present disclosure. Method 400 may enable the determination whether or not to provide an OTA update to a vehicle based on the vehicle SOC and location. The flowchart of FIG. 4 is representative of machine readable instructions that are stored in memory and may include one or more programs which, when executed by a processor may cause vehicle 100, server 120 and/or one or more systems or devices described herein to carry out one or more functions described herein. While the example program is described with reference to the flowchart illustrated in FIG. 4, many other methods for carrying out the functions described herein may alternatively be used. For example, the order of execution of the blocks may be rearranged or performed in series or parallel with each other, blocks may be changed, eliminated, and/or combined to perform method 400. Further, because method 400 is disclosed in connection with the components of FIGS. 1-3, some functions of those components will not be described in detail below.

Method 400 may start at block 402. At block 404, method 400 may include determining whether there is a pending vehicle update. If there is a pending vehicle update, method 400 may include determining one or more update characteristics of the pending update at block 406. The update characteristics may include the number of update files, file sizes, and any other metric such as those described herein.

At block 408, method 400 may include determining a vehicle battery SOC threshold. The threshold may be determined based on the update characteristic(s) determined at block 406.

At block 410, method 400 may include determining whether a key-off event has occurred, by detecting a key-off event. If a key-off event has occurred, indicating that the vehicle has been turned off and is no longer in use, method 400 may include determining the vehicle location at block 412. This may be done using GPS data, or other data corresponding to the vehicle.

At block 414, method 400 may include determining one or more vehicle battery characteristics. This may include the battery state of charge, as well as the battery age, temperature, output voltage and current, charge acceptance, and/or one or more other characteristics.

At block 416, method 400 may include modifying the threshold based on the determined battery characteristics. For instance, the threshold may be increased where the battery is determined to be older or able to hold less charge.

At block 418, method 400 may include modifying the threshold based on the location of vehicle. As noted above, this may include increasing the threshold where it is determined that the vehicle is located in a long term parking location such as an airport parking lot.

At block 420, method 400 may include determining whether the battery SOC is greater than the threshold. This may include comparing the battery SOC to a plurality of thresholds, and determining which of the thresholds are met or not met. As such, block 420 may also include determining which update(s) may be completed without reducing the battery SOC below the threshold.

If the threshold is too high, and the battery SOC is below the threshold, then the update may not be performed, and the method may end at block 424.

But if the battery SOC is above the threshold, at block 422 method 400 may include providing the update based on the battery SOC and the threshold. This may include selecting a subset of updates if there is a plurality of updates, and transmitting the updates over the air to the vehicle. Method 400 may then end at block 424.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle over-the-air update system comprising:
a vehicle configured to determine a vehicle battery state of charge (SOC); and
a server configured to:
determine an update characteristic of a pending software update for the vehicle;
determine a vehicle battery SOC threshold based on the update characteristic;
modify the threshold based on a location of the vehicle a most recent key-off event of the vehicle; and
responsively provide the pending software update to the vehicle based on the vehicle battery SOC and the threshold.

2. The vehicle over-the-air update system of claim 1, wherein (i) the pending software update comprises a plurality of update files, (ii) the update characteristic comprises a plurality of file sizes corresponding to the plurality of update files, and (iii) the vehicle battery SOC threshold comprises a plurality of thresholds corresponding to the plurality of update files, and wherein the server is further configure to:
provide a subset of the plurality of update files based on the plurality of thresholds corresponding to the plurality of update files.

3. The vehicle over-the-air update system of claim 1, wherein the server is further configured to:
determine that the vehicle has experienced a key-off event; and
responsively determine the update characteristic of the pending software update for the vehicle.

4. A method comprising:
determining an update characteristic of a pending software update for a vehicle;
determining a vehicle battery state of charge (SOC) threshold based on the update characteristic;
modifying the threshold based on a location of the vehicle;
determining a SOC of a battery of the vehicle; and
responsively providing the pending software update to the vehicle based on the SOC and the threshold,
wherein the pending software update comprises a software update for an electronic control unit (ECU) of the vehicle.

5. The method of claim 4, wherein the update characteristic comprises a file size of the pending software update.

6. The method of claim 4, wherein the pending software update comprises a plurality of update files, and wherein the update characteristic comprises a plurality of file sizes corresponding to the plurality of update files.

7. The method of claim 6, wherein the vehicle battery SOC threshold comprises a plurality of thresholds corresponding to the plurality of update files.

8. The method of claim 7, wherein providing the pending software update to the vehicle based on the SOC and the threshold comprises:
providing a subset of the plurality of update files based on the plurality of thresholds corresponding to the plurality of update files.

9. The method of claim 4, wherein modifying the threshold based on the location of the vehicle comprises modifying the threshold based on the location of the vehicle at a most recent key-off event of the vehicle.

10. The method of claim 4, wherein modifying the threshold based on the location of the vehicle comprises modifying the threshold based on a predicted parking location of the vehicle.

11. The method of claim 4, wherein the SOC of the vehicle is determined at a most recent key-off event of the vehicle.

12. The method of claim 4, further comprising:
providing a notification to a remote computing device corresponding to the vehicle, wherein the notification indicates that a software update is being performed.

13. The method of claim 4, further comprising:
determining that the vehicle has experienced a key-off event; and
responsively determining the update characteristic of the pending software update for the vehicle.

14. The method of claim 4, wherein providing the pending software update to the vehicle based on the SOC and the threshold comprises providing the pending software update over-the-air.

15. A tangible, computer readable medium including instructions that, when executed, cause performance of a set of acts comprising:
determining an update characteristic of a pending software update for a vehicle;
determining a vehicle battery state of charge (SOC) threshold based on the update characteristic;
modifying the threshold based on a location of the vehicle at a most recent key-off event of the vehicle;
determining a vehicle battery SOC; and
responsively providing the pending software update based on the vehicle battery SOC and the threshold.

16. The tangible, computer readable medium of claim 15, wherein (i) the pending software update comprises a plurality of update files, (ii) the update characteristic comprises a plurality of file sizes corresponding to the plurality of update files, and (iii) the vehicle battery SOC threshold comprises a plurality of thresholds corresponding to the plurality of update files, the set of acts further comprising:
providing a subset of the plurality of update files based on the plurality of thresholds corresponding to the plurality of update files.

17. The tangible, computer readable medium of claim 15, the set of acts further comprising:
determining that the vehicle has experienced a key-off event; and
responsively determining the update characteristic of the pending software update for the vehicle.

* * * * *